Figure 6:
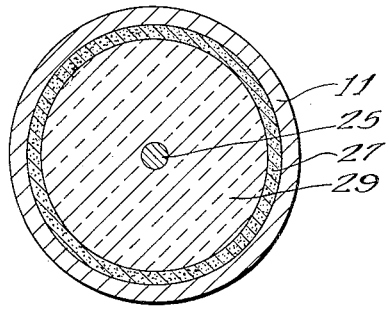
Figure 7:
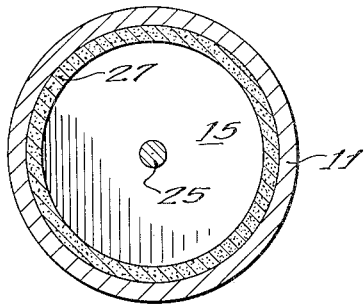

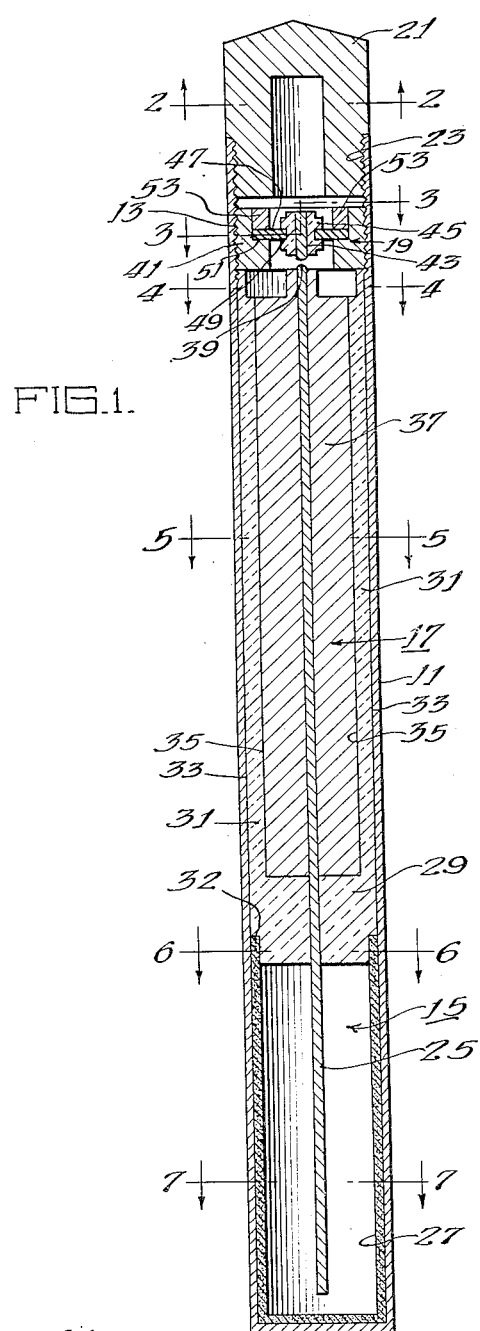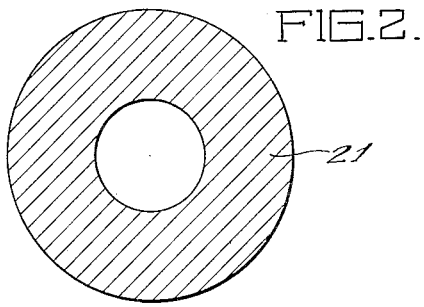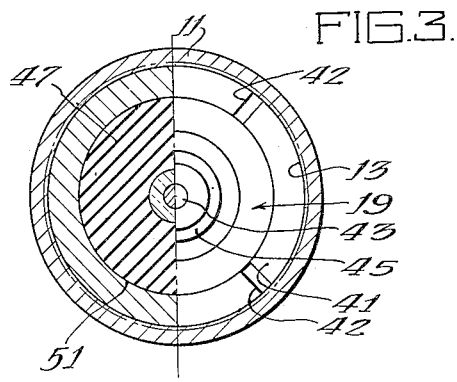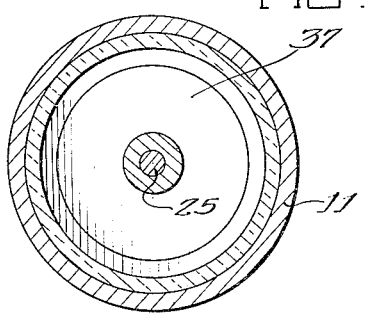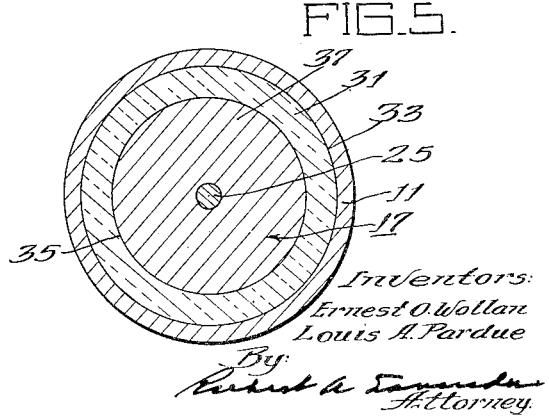

Patented Jan. 2, 1951

2,536,991

UNITED STATES PATENT OFFICE 2,536,991

RADIATION DETECTOR

Ernest O. Wollan and Louis A. Pardue, Oak Ridge, Tenn., assignors to the United States of America as represented by the United States Atomic Energy Commission Application September 18, 1945, Serial No. 617,129

13 Claims. (Cl. 250—27.5)

The present invention relates to apparatus for the detection and measurement of quantum radiation, such as gamma and X-ray type radiation, which is inherently dangerous to living tissue.

In the carrying out of various chemical and other procedures involving radioactive materials, the operating personnel is almost continuously subjected to various types of radiant energy emanating from such materials. While short exposures to these emanations are not particularly dangerous, it is a well-established fact that the physiological effects of certain radiations are cumulative, and that prolonged exposure to even relatively small amounts of low energy quantum radiation, especially quantum radiation of the gamma and X-ray type, will cause serious injury. Hence, in order to adequately safeguard the health of persons working with, or in the vicinity of, radioactive materials it is very important that means be available whereby the presence of such radiations and the integrated exposure of individual workers thereto can be readily determined.

While the physiological danger to living tissue is dependent to some extent upon the intensity or energy level of the radiation, the amount of damage produced by quantum radiation of both gamma and X-ray types is fairly accurately indicated by measuring and integrating the exposure over a given period of time in roentgen units. For example, the ordinary healthy adult can safely receive an exposure of about 100 milliroentgens per day or about 3 roentgens per month.

Various means have been proposed for detecting and metering exposure to gamma and X-ray type quantum radiation. One of the most satisfactory devices for this purpose comprises a small portable ion chamber, which is of pocket size in order that it may be carried on the person of an individual who is exposed to quantum radiation. These chambers are charged to a definite potential before being put into use, and, periodically, they are collected and a measurement is made of the charge remaining in each instrument. The structure and constants of these portable ion chambers are such that ionization is produced therein when the chamber is subjected to gamma or X-ray type quantum radiation. Such ionization effects partial discharge of the electrical charge initially carried by the ion chamber, and when the instrument is checked, the amount of charge remaining provides a convenient measure of the amount of radiation which reached the ion chamber during the exposure period. It is, of course, a simple matter to calibrate these chambers in such manner that the loss of charge indication can be interpreted in terms of roentgen unit exposure of the wearer.

However, certain difficulties have been experienced with the known ion chambers of this type. Since the chamber is of pocket size and is carried by a living individual in close proximity to his body, variable humidity conditions will result, due to normal varation in body perspiration rate. Under some conditions, the humidity will be great enough to produce partial or complete discharge of the chamber, thereby inducing errors and possible errors in the readings obtained which create serious doubts regarding the accuracy of any readings obtained. Furthermore, great difficulty has been experienced in obtaining an ion chamber, and especially a pocket size ion chamber, having a discharge characteristic which is truly indicative of the physiological damage probably resulting from the radiation received and being measured by such instrument.

There is, therefore, a great need in the art for an improved, pocket-type ion chamber of the type above described, and the principal object of the present invention is the provision of such a device. Other and more specific objects of the invention include the provision of an improved pocket-type ion chamber having a response characteristic which is substantially independent of the humidity of the surrounding atmosphere, and, of even greater importance, the provision of an improved chamber having a response characteristic which is accurately indicative of the physiological damage caused to living tissue.

Figure 8:
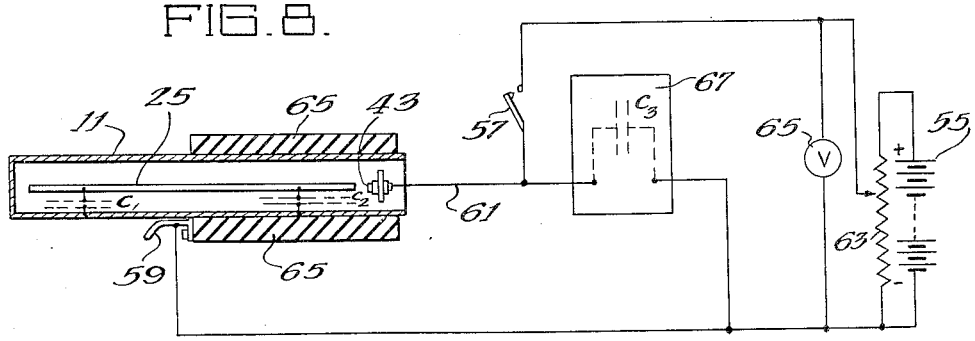

As will hereinafter appear, these objects of the invention are accomplished by the embodiment into a pocket type ion chamber of a number of novel structural and operational features. These and the other features and advantages of the invention will be made more apparent by reference to the following description and the accompanying drawings of one illustrative embodiment thereof. In the drawings:

Fig. 1 is a longitudinal sectional view through a pocket type ionization chamber constructed in accordance with the invention;

Figs. 2 through 7 are, respectively, enlarged, sectional views taken on the lines 2—2, 3—3, 4—4, 5—5, 6—6 and 7—7 of Fig. 1; and Fig. 8 is a diagrammatic view showing one arrangement for charging ion chambers of the subject type and for measuring the loss of charge which occurs therein during use.

The pocket type ion chamber constituting particular embodiment of the invention illustrated in the drawings includes a hollow, cylindrical, main casing 11 which supports and contains the other elements of the device. The casing 11 is preferably made of aluminum or of some other moisture-proof material which is permeable to gamma and X-ray type quantum radiation. Desirably, it should be of conducting material. The lower end of the casing 11 is closed, and the other end is open and provided with an internally, threaded portion 13.

Disposed within the main casing 11 are the various structural elements which make up the three main portions of the device. These include the ion chamber section 15, located adjacent the lower end of the device, a condenser unit 17, which is electrically in parallel with the electrodes of the ionization chamber 15 for increasing the electrical capacity of the device, and a combined, movable charging contact and seal unit 19, the function of which will appear later, located at the open end of the main casing 11. There is also a screw-on cap 21, which may be of metal or of insulating material, having a threaded portion 23 for engaging the internally threaded portion 13 at the open end of the outer casing 11, as illustrated.

The ionization chamber in the ion chamber section 15 is defined by two concentric, cylindrical electrodes 25 and 27. The central or collecting electrode 25 is rodlike in form and is conveniently made of brass or other conducting material. It is supported centrally of the outer casing 11 by means including a main insulator 29. The insulator 29 should be made of polystyrene or some other insulating material of very high insulating value, and it includes a cup-shaped, thin walled, cylindrical portion 31 which is utilized to insulate the conducting surfaces of the condenser unit 17, as will hereinafter appear.

The outer electrode 27 comprises a thin walled, cup-shaped member which is adapted to fit within the lower end of the outer casing 11, and the dimensions of engaging surfaces of the casing 11 and the electrode 27 are such that a tight fit with good electrical contact therebetween, will be obtained. The lower portion of the main insulator has an annular groove 32 formed therein for engaging the upper end of the outer electrode 27. The outer electrode 27 is preferably constructed of a conducting plastic which has substantially the same average atomic weight and the same carbon to hydrogen ratio as the human body. As is well known, the ionization which is produced in material by an incident beam of radiation is proportional to the atomic weight of the material. Material having the average atomic weight of the human body therefore produces the same ionization that the human body would undergo when subjected to this incident radiation. Here average is used in its usual mathematical sense. A graphite-impregnated, resinous, methyl methacrylate polymer comprising 10.7 per cent graphite and 89.3 per cent resin is a satisfactory material for this purpose.

The utilization of this material for one of the electrodes of the device is a desirable feature of this invention. During use, any beta or alpha radiation emitted by the outer casing 11, due to irradiation thereof, will be absorbed in the plastic outer electrode 27, and the ionization in the chamber 15 will be due solely to the electrons emitted from the plastic electrode 27 due to quantum irradiation reaching such electrode. Hence, since the average atomic weight characteristics of the plastic electrode 27 are substantially the same as those of living tissue, the ionization produced within the ion chamber, as a result of quantum irradiation of such chamber will be almost exactly proportional to the probable physiological injury to living tissue. The use of plastic electrodes of the type herein described is more fully disclosed and claimed in the copending application of John R. Raper and R. E. Zirkle, Serial No. 730,136, entitled "Ionization Chamber," and reference is hereby made to that application.

The condenser unit 17 is disposed adjacent the ionization chamber portion 15, and includes concentric conducting surfaces 33 and 35, which are spaced apart by the cup-shaped portion 31 of the main insulator 29. The inner surface 35 is defined by a cylindrical, aluminum insert 37 of suitable dimensions which is adapted to be disposed within the insulator portion 31. The aluminum insert 37 has a centrally disposed opening provided therein for receiving the inner collecting electrode rod 25, preferably with a press-fit, and a small projection 39 is provided at the upper end for facilitating the operation of the movable charging contact and seal unit 19. The outer condenser surface 33 is provided by the inner surface of the main casing 11. The outer, peripheral surface of the insulator portion 31 is desirably coated with aquadag, or the like, and the entire inner surface of the insulator portion 31 is likewise covered with aquadag. Since the insulator portion 31 is just a snug fit within the outer casing 11, and since the insert 37 is likewise a snug fit within the insulator portion 31, these coatings aid in providing smooth, continuous, conducting surfaces for the condenser. In instances where a non-metallic outer casing 11 is used or where a non-metallic insert 37 is desired, the aquadag coating or coatings may be used as one or both of the condenser surfaces. The condenser unit 17 provides a substantial capacity in parallel with the ionization chamber 15.

The structural elements comprising the ionization chamber 15 and the condenser unit 17 are held in place within the outer casing 11 by an annular, externally threaded ring 41 which also serves as the main support for the combined seal and charging contact unit 19. The ring 41 is adapted to be screwed into the threaded end portion 13 of the outer casing 11 and is provided at its upper end with slots 42 for engagement with a suitable driving tool.

The seal and contact unit 19 include a short, cylindrically shaped, charging pin 43 which is of about the same diameter as the central electrode 25 and which is supported upon a cylindrical insulator 45, desirably of polystyrene or other high quality insulating material. The insulator 45 is, in turn, supported upon a flexible, rubber diaphragm or washer 47, which is annular shaped. The inner peripheral edge of the washer 47 is adapted to engage a suitably dimensioned, annular groove 49 formed in the insulator 45 supporting the charging pin 43. The outer edge of the washer 47 rests against a shoulder 51 formed by an annular recess provided in the annular, support ring 41, and is there clamped firmly in place by a annular clamping ring 53 which is pressfitted, or otherwise securely attached to the annular support ring 41, as illustrated. It will be apparent that this arrangement provides a charging contact which is normally out of electrical contact with the ion chamber electrodes 25 and 27 and the conducting surfaces 33 and 35 of the condenser unit 17, but which, by virtue of the flexible diaphragm support therefor, can be moved into contact with the central electrode 25 by the application of an axial force to the contact end of the instrument. At the same time, the structure provides an air and liquid-tight seal at the end of the instrument. In this connection, it will sometimes be desirable to apply a suitable waterproofing cement, such as a glyptal cement, to the washer 47 and the elements engaging the washer 47.

When it is desired to put the device into operation, it is, of course, necessary to supply an electrical charge to the ionization chamber 15 and to the condenser 17 which is in parallel therewith. This can be accomplished very conveniently by a circuit arrangement such as that illustrated diagrammatically in Fig. 8. The circuit of Fig. 8 includes a battery 55 of suitable potential, a single pole, single-throw switch 57, which may be of the push button type, a spring terminal 59 adapted for connection to the outer casing of the ion chamber device, and a second terminal or probe 61 arranged so that it may contact the charging pin 43 constituting a part of the movable connection at the end of the device. To provide for standardization of the voltage supplied by the battery 55, the circuit desirably includes a potentiometer 63 and a voltmeter 65 connected as shown.

In carrying out the charging operation, the device is inserted in a suitable insulating guideway, indicated at 65. The outer casing 11 there engages the spring terminal 59, whereupon the outer terminal 27 of the ionization chamber and the outer conducting surface 33 of the condenser unit 17 are electrically connected to one side of the charging voltage. The device is then pushed into contact with the probe terminal 61 with sufficient force to move the charging pin 43 into engagement with the central or collecting electrode 25. With the device in this position the switch 57 is closed applying the charging voltage thereto. The device may then be withdrawn from the guideway 65, and after the cap 21 has been replaced, it is ready for use.

Upon release of axial pressure on the casing 11 at the conclusion of the charging operation, the charging pin 43 will disengage the central electrode 25, thereby electrically isolating the charged portions of the device. Furthermore, since the diaphragm support for the charging pin 43 provides a moisture proof seal at the end of the outer casing 11, which is itself of moisture proof construction, the entire device is rendered moisture and dust proof.

In the particular device described, it has been found advisable to use a charging potential of the order of 150 to 200 volts. Since the charging apparatus is also employed as a metering instrument, it includes an electroscope unit 67 in parallel with the terminals 59 and 61. The operation of this will be described in a subsequent paragraph.

Conveniently, the ion chamber device is of such size that it can be carried on the person of the wearer. The particular device illustrated in the drawings has an overall length of about 5½ inches and a diameter of about ⅝ inch, being just a little larger than a fountain pen. Gamma or X-ray type quantum radiation incident upon the device, will effect ionization within the ionization chamber 15, causing a current to flow between the two electrodes 25 and 27, with resultant loss of the charge previously applied to the paralleled ionization chamber 15 and condenser 17. Since, as previously pointed out, the outer electrode 27 is of a conducting material having substantially the same atomic weight and the same carbon to hydrogen ratio as the human body, the amount of ionization, which takes place within the chamber 15, and hence the proportionate loss of voltage resulting from the discharge of the ion chamber 15 and condenser 17, will be substantially proportional to the amount of dangerous radiation reaching the wearer of the device.

In order to determine and evaluate the extent to which the ion chamber 15 and the condenser 17 have been discharged, it is most convenient to measure the charge remaining in the instrument after the predetermined period of exposure. This can be done by any well-known means, and the circuit illustrated diagrammatically in Fig. 8 is adapted for such measurements. To measure the charge remaining in an irradiated partially discharged chamber, the cup 21 is removed and the device is pushed into the guideway 65 until the probe contact 61 just touches the charging pin 43 thereby eliminating capacitance effects between the pin 43 and electrodes 11 and 25. In this position the outer casing 11 is contacted by the terminal 59. The switch 57 is then closed, with the result that the electrometer unit 67, which has a definite capacity, as indicated by the condenser symbol $C_3$, is charged to the potential supplied by the battery 55. This potential should be the same as that used in the initial charging operation. The charging pin 43 is simultaneously brought to the potential of one side of the voltage source. Next, the switch 57 is opened, and the movable charging pin 43 is pushed against the probe terminal 61 with sufficient force to move the charging pin 43 against the inner electrode 25. The effect of this is to connect the capacity of the ion chamber device, which includes the paralleled capacities of the ionization chamber 15 and the condenser portion 17 thereof, as indicated by the condenser symbols $C_1$ and $C_2$, in parallel with the electrometer unit which has a capacity $C_3$. The condenser $C_1$ and $C_2$ comprising the ion chamber device and the capacitance $C_3$ of the electroscope 67 will thereupon share their charges and an equilibrium voltage will be reached. The electroscope may then be used as a voltmeter to indicate the equilibrium voltage, and by comparison of this voltage with the charging voltage, it is a simple matter to obtain an accurate evaluation of the amount of charge which has been lost. The charges divide inversely as the capacitances.

If a series of these measurements are being made at regular intervals, it will be found desirable to calibrate the electrometer 67 directly in roentgen units, and particularly satisfactory results have been obtained utilizing a projection type electrometer with a scale of about 8 inches for an exposure of 2 roentgens. Generally, the electrometer scale will not be linear, small exposures giving a larger proportionate movement of the fiber. In the particular embodiment of the invention described above, the electrometer 67 has a capacity of about 2 mmf. and the ion chamber device has a capacity of about 14 mmf.

In the foregoing, there has been disclosed the features of a new and improved pocket-type ion chamber device. The device, by virtue of the particular constructional features embodied therein, may be used under conditions of widely varying humidity, or in locations which are exposed to dust or lint without risk of loss of the charge which has been initially stored therein, and, by virtue of the novel electrode construction utilized, the response of the instrument is substantially equivalent to the injury produced in living tissue by quantum radiation of the gamma or X-ray type. The apparatus has effectively overcome the principal deficiencies of the devices previously known in the art. The features of the invention, which are believed to be new, are expressly pointed out in the appended claims.

What is claimed is:

1. In an ion chamber of the class described, tubular means defining the walls of a moisture proof outer casing, a pair of spaced apart, insulated electrodes disposed within said outer casing, and an insulated charging pin supported upon said outer casing by resilient means which normally holds said pin out of contact with said electrodes but which permits said pin to be moved into temporary contact with one of said electrodes during the charging of said ion chamber.

2. In an ion chamber of the class described, a hollow cylindrical member of conducting material, which is permeable to quantum radiation, defining the walls of a moisture proof outer casing, a hollow, cylindrical outer electrode disposed within said casing in electrical contact therewith, a rod-like, inner, collecting electrode supported within said casing so as to extend centrally within said outer electrode and being insulated therefrom, and a charging pin supported at one end of said casing by insulating, resilient means which normally holds said pin out of contact with said electrodes but which permits said pin to be moved into temporary contact with said inner electrode during the charging of said ion chamber.

3. In an ion chamber of the class described, a hollow cylindrical member of a conducting material, which is permeable to quantum radiation, defining the walls of a moisture-proof casing closed at one end and open at the other end thereof, a hollow, cylindrical, outer electrode disposed within said casing in electrical contact therewith, a rod-like, inner, collecting electrode supported within said casing so as to extend centrally within said outer electrode and being insulated therefrom, and means including a charging pin and a flexible diaphragm support for said pin disposed at the open end of said casing, said means providing a moisture-proof seal for the open end of said casing, said flexible diaphragm support insulating said pin from said outer casing, normally holding said pin out of contact with said electrodes, and permitting said pin to be moved into temporary contact with said inner electrode during the charging of said ion chamber.

4. In an ion chamber of the class described, tubular means defining the walls of a moisture-proof outer casing, a pair of spaced apart, insulated electrodes disposed within said outer casing, and an insulated charging pin supported upon said outer casing by resilient means which normally holds said pin out of contact with said electrodes but which permits said pin to be moved into temporary contact with one of said electrodes during the charging of said ion chamber, at least one of said electrodes being of an electrically conductive composition of approximately the same atomic weight as the human body.

5. In an ion chamber of the class described, a hollow cylindrical member of conducting material, which is permeable to quantum radiation, defining the walls of a moisture proof outer casing, a hollow cylindrical outer electrode disposed within said casing in electrical contact therewith, said electrode being constructed at least in part of electrically conductive material of approximately the same average atomic weight as the human body, a rod-like, inner, collecting electrode supported within said casing so as to extend centrally within said outer electrode and being insulated therefrom, and a charging pin supported at one end of said casing by insulating, resilient means which normally holds said pin out of contact with said electrodes but which permits said pin to be moved into temporary contact with said inner electrode during the charging of said ion chamber.

6. In an ion chamber of the class described, a hollow cylindrical member of a conducting material, which is permeable to quantum radiation, defining the walls of a moisture-proof casing closed at one end and open at the other end thereof, a hollow, cylindrical, outer electrode disposed within said casing in electrical contact therewith, said electrode being constructed of an electrically conducting material having approximately the same carbon to hydrogen ratio and the same average atomic weight as the human body, a rod-like, inner, collecting electrode supported within said casing so as to extend centrally within said outer electrode and being insulated therefrom, and means including a charging pin and a flexible diaphragm support for said pin disposed at the open end of said casing, said means providing a moisture proof seal for the open end of said casing, said flexible diaphragm support insulating said pin from said outer casing, normally holding said pin out of contact with said electrodes, and permitting said pin to be moved into temporary contact with said inner electrode during the charging of said ion chamber.

7. In an ion chamber of the class described, tubular means defining the walls of a moisture proof outer casing, a pair of spaced apart, insulated electrodes disposed within said outer casing, an insulated charging pin supported upon said outer casing by resilient means which normally holds said pin out of contact with said electrodes but which permits said pin to be moved into temporary contact with one of said electrodes during the charging of said ion chamber, and a built-in condenser unit which is connected in parallel with said electrodes, also disposed within said casing.

8. In apparatus of the class described, tubular means defining the walls of a moisture proof outer casing, a short, tubular, outer electrode disposed within said casing at one end thereof, a rod-like, inner, collecting electrode supported within said casing so as to extend centrally within said outer electrode and being insulated therefrom, a charging pin supported at one end of said casing, by insulating, resilient means which normally holds said pin out of contact with said electrodes but which permits said pin to be moved into temporary contact with said inner electrode during the charging of said ion chamber, and a built-in condenser unit which is connected in parallel with said ionization chamber, said condenser unit comprising a hollow cylindrical member of insulating material disposed within said casing adjacent said ionization chamber and concentric surfaces of conducting material spaced apart by said insulating member.

9. In apparatus of the class described, a hollow cylindrical member of conducting material, which is permeable to quantum radiation, defining the walls of a moisture-proof outer casing, a short, hollow cylindrical, outer electrode disposed coaxially within said casing at one end thereof and in electrical contact therewith, a rodlike, inner, collecting electrode supported by insulating means coaxially within said casing, said inner electrode extending within said outer electrode to provide an ionization chamber at one end of said casing, means including a charging pin and a flexible diaphragm support for said pin disposed at the open end of said casing, said means providing a moisture proof seal for the open end of said casing, said flexible diaphragm support insulating said pin from said outer casing, normally holding said pin out of contact with said electrodes, and permitting said pin to be moved into temporary contact with said inner electrode during the charging of said ion chamber, and a built-in condenser unit which is connected in parallel with said ionization chamber, said condenser unit comprising a hollow cylindrical member of insulating material disposed concentrically within said casing adjacent said ionization chamber and the conducting surfaces of said condenser unit being defined by said outer casing and by a cylindrical enlargement of said inner electrode.

10. In an ion chamber of the class described, tubular means defining the walls of a moisture proof outer casing, a pair of spaced apart, insulated electrodes disposed within said outer casing, an insulated charging pin supported upon said outer casing by resilient means which normally holds said pin out of contact with said electrodes but which permits said pin to be moved into temporary contact with one of said electrodes during the charging of said ion chamber, at least one of said electrodes being of an electrically conductive composition of approximately the same atomic weight as the human body, and a built-in condenser unit which is connected in parallel with said electrodes and which is also disposed within said casing.

11. In apparatus of the class described, tubular means defining the walls of a moisture-proof outer casing, a short, tubular, outer electrode disposed within said casing at one end thereof, said electrode being constructed at least in part of electrically conductive material of approximately the same average atomic weight as the human body, a rod-like, inner, collecting electrode supported within said casing so as to extend centrally within said outer electrode and being insulated therefrom, a charging pin supported at one end of said casing by insulating, resilient means which nomally holds said pin out of contact with said electrodes but which permits said pin to be moved into temporary contact with said inner electrode during the charging of said ion chamber, and a built-in condenser unit which is connected in parallel with said ionization chamber, said condenser unit comprising a hollow cylindrical member of insulating material disposed within said casing adjacent said ionization chamber and concentric surfaces of conducting material spaced apart by said insulating member.

12. In apparatus of the class described, a hollow cylindrical member of conducting material, which is permeable to quantum radiation, defining the walls of a moisture proof outer casing, a short, hollow cylindrical, outer electrode disposed coaxially within said casing at one end thereof and in electrical contact therewith, said electrode being constructed of an electrically conducting material having approximately the same carbon to hydrogen ratio and the same average atomic weight as the human body, means including a charging pin and a flexible diaphragm support for said pin disposed at the open end of said casing, said means providing a moisture proof seal for the open end of said casing, said flexible diaphragm support insulating said pin from said outer casing, normally holding said pin out of contact with said electrodes, and permitting said pin to be moved into temporary contact with said inner electrode during the charging of said ion chamber, and a built-in condenser unit which is connected in parallel with said ionization chamber, said condenser unit comprising a hollow cylindrical member of insulating material disposed concentrically within said casing adjacent said ionization chamber, and the conducting surfaces of said condenser unit being defined by said outer casing and by a cylindrical enlargement of said inner electrode.

13. An ionization chamber comprising at least two mutually insulated electrodes having an ionizing medium therebetween, means for hermetically sealing said ionizing medium, an insulated charging pin supported upon said means for hermetically sealing the ionizing medium by resilient means which normally holds said pin out of contact with one of said electrodes, but which permits said pin to be moved into temporary contact with said electrode during the charging of said ion chamber.

ERNEST O. WOLLAN.
LOUIS A. PARDUE.

REFERENCES CITED

The following references are of record in the file of this patent:

UNITED STATES PATENTS

| Number | Name | Date |
|---|---|---|
| 1,855,669 | Glasser et al. | Apr. 26, 1932 |
| 2,122,222 | Vingerhoets | June 28, 1938 |

FOREIGN PATENTS

| Number | Country | Date |
|---|---|---|
| 531,325 | France | Jan. 11, 1922 |
| 401,370 | Germany | Aug. 30, 1924 |
| 784,956 | France | May 6, 1935 |